United States Patent
Ebisumoto et al.

(10) Patent No.: US 11,226,015 B2
(45) Date of Patent: *Jan. 18, 2022

(54) FRICTION ENGAGING DEVICE

(71) Applicant: Mazda Motor Corporation, Hiroshima (JP)

(72) Inventors: Hirofumi Ebisumoto, Aki-gun (JP); Tsukasa Sori, Hiroshima (JP); Hitoshi Tamegai, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/810,006

(22) Filed: Mar. 5, 2020

(65) Prior Publication Data

US 2020/0378452 A1     Dec. 3, 2020

(30) Foreign Application Priority Data

May 28, 2019    (JP) .............................. JP2019-099629

(51) Int. Cl.
*F16D 25/0638* (2006.01)
*F16H 63/30* (2006.01)
*F16D 13/42* (2006.01)
*F16D 25/02* (2006.01)
(Continued)

(52) U.S. Cl.
CPC ......... *F16D 25/0638* (2013.01); *F16D 13/42* (2013.01); *F16D 13/68* (2013.01); *F16D 13/69* (2013.01); *F16D 25/02* (2013.01); *F16H 63/3026* (2013.01)

(58) Field of Classification Search
CPC .... F16D 25/0638; F16D 25/02; F16D 25/123; F16D 25/12; F16D 13/69; F16D 13/42; F16D 13/52; F16D 13/68; F16D 13/70; F16D 13/683; F16D 2300/12; F16H 63/3026
See application file for complete search history.

(56) References Cited

U.S. PATENT DOCUMENTS 2,935,169 A *   5/1960   Mills ........................ F16D 13/52
                                                                            192/85.4
3,537,556 A    11/1970   Pfeffer et al.
(Continued)

FOREIGN PATENT DOCUMENTS

| JP | H05187458 A | 7/1993 | |
| JP | 200313996 A | 1/2003 | |
| WO | WO-2015075133 A2 * | 5/2015 | ......... F16D 25/0638 |

*Primary Examiner* — David R Morris
*Assistant Examiner* — Lori Wu
(74) *Attorney, Agent, or Firm* — Alleman Hall Creasman & Tuttle LLP

(57) ABSTRACT

The present disclosure provides a wet friction engaging device. The device includes a plate group engaged with two connecting members and including two groups of friction plates housed in a plate housing chamber and alternately arranged in an axial direction with surfaces facing each other. The plate group is switched between an engaged state in which the friction plates are in close contact with each other, and a disengaged state in which the friction plates are separable from each other. End plates at respective ends of the plate group are kept at a larger distance in the axial direction after a switch to the disengaged state than in the engaged state.

6 Claims, 11 Drawing Sheets

(51) Int. Cl.
 F16D 13/68 (2006.01)
 F16D 13/69 (2006.01)

(56) References Cited

U.S. PATENT DOCUMENTS

| | | | | |
|---|---|---|---|---|
| 3,744,605 A | * | 7/1973 | Piret | ........................ F16H 57/08 |
| | | | | 192/70.2 |
| 4,548,306 A | * | 10/1985 | Hartz | ...................... F16D 13/52 |
| | | | | 192/70.28 |
| 4,802,564 A | | 2/1989 | Stodt | |
| 4,828,089 A | * | 5/1989 | Collins | ................... F16D 13/52 |
| | | | | 188/251 A |
| 5,383,544 A | | 1/1995 | Patel | |
| 5,975,267 A | | 11/1999 | Takakura et al. | |
| 2005/0000776 A1 | | 1/2005 | Merkel et al. | |
| 2017/0335898 A1 | | 11/2017 | Yoldjou et al. | |
| 2018/0238398 A1 | | 8/2018 | Rippelmeyer et al. | |

* cited by examiner

FRICTION ENGAGING DEVICE

CROSS-REFERENCE TO RELATED APPLICATION

This application claims priority to Japanese Patent Application No. 2019-099629 filed on May 28, 2019, the entire disclosure of which is incorporated by reference herein.

BACKGROUND

The present disclosure relates to a wet friction engaging device being a clutch or a brake, for example, included in a transmission, for example.

In general, friction engaging devices of this type include friction plates being drive plates or driven plates. The drive and driven plates are connected to a hub and a drum, for example, and arranged alternately along the thickness of the plates to be slidable with each other. Among these friction plates, lubricating oil (ATF) is supplied during the use of the friction engaging device (what is called a "wet type").

These friction plates are pressed into close contact with each other to connect the hub and the drum to each other (i.e., an engaged state). The pressing force is released to separate these friction plates from each other, whereby the hub and the drum operate independently (i.e., a disengaged state).

In a friction engaging device of this type, adjacent friction plates may not be separated properly even in the disengaged state to cause frictional resistance between the friction plates (i.e., a drag phenomenon). Since this frictional resistance causes an unnecessary torque (e.g., a drag torque), various measures have been considered.

For example, Japanese Unexamined Patent Publication No. H05-187458 discloses a clutch device including ring wave springs between adjacent friction plates so that the elastic force of the springs provides wider gaps between the friction plates in a disengaged state.

Japanese Unexamined Patent Publication No. 2003-13996 discloses a friction engaging device including spring clips attached to friction plates so that the elastic force of the clips applies a biasing force to separate the friction plates from each other.

SUMMARY

With the use of the techniques according to Japanese Unexamined Patent Publication Nos. H05-187458 and 2003-13996, the adjacent friction plates are stably separated from each other in the disengaged state.

There is a need, however, for these techniques to prepare a large number of the wave springs or spring clips and to properly assemble these components one by one in proper positions in the gaps between the friction plates. This increases the number of the components, the cost for the members, the number of assembling steps, and the burden of the assembling work. In addition, even a single defective component may hinder proper effects.

To address the problem, after detailed studies of the drag phenomenon, the present inventors found that the drag phenomenon can be effectively reduced with a very simple structure based on the mechanism of the phenomenon.

It is a principal objective of the present disclosure to achieve a friction engaging device capable of effectively reducing a drag phenomenon even with a simple structure.

The present disclosure relates to a wet friction engaging device that switches the transmission of power to be output to a rotary shaft.

The friction engaging device includes: two connecting members, each having an opposed surface facing an opposed surface of the other connecting member in a radial direction with a plate housing chamber interposed therebetween, the chamber being supplied with lubricating oil; and a plate group engaged with the connecting members and including two groups of friction plates housed in the plate housing chamber and alternately arranged in an axial direction with surfaces facing each other. The plate group is switched between an engaged state in which the friction plates are in close contact with each other upon application of a pressing force, and a disengaged state in which the friction plates are separable from each other upon release of the pressing force.

End plates at respective ends of the plate group are kept at a larger distance in the axial direction after a switch to the disengaged state than in the engaged state.

Specifically, the switch to the disengaged state allows free axial movement of the friction plates constituting the plate group. After the switch to the disengaged state, however, the end plates at the respective ends of the plate group are forcibly kept at a predetermined distance to restrict the axial movement.

Although the detail will be described later, the present inventors found that only with this configuration, the pressure balance naturally arranges the friction plates at a substantially equal interval. Accordingly, this friction engaging device effectively reduces a drag phenomenon even with a simple structure.

The friction engaging device may further include a piston moving forward from one side in the axial direction toward the plate group to apply the pressing force to the plate group. One of the end plates may be a movable end plate movable in the axial direction together with the piston, and the other may be a stationary end plate immovable in the axial direction.

With this configuration, a high-performance friction engaging device is easily achieved using the existing members.

Specifically, the movable end plate may be integral with the piston through welding or integral molding.

In this way, the movable end plate is obtained in a very simple manner.

The friction engaging device may also be configured as follows. The opposed surface of one of the connecting members may have slide recesses extending in the axial direction and having closed ends on a side closer to the piston. Each of the friction plates of one of the groups may have slide projections to be fitted into the slide recesses from a side away from the piston so as to be slidable. The slide recesses may include a movement regulator at a part away from the piston. The movement regulator may restrict sliding of one of the friction plates of the one of the groups, which is fitted last, toward the piston to provide the stationary end plate.

In this way, the stationary end plate is obtained in a very simple manner using the existing members.

The friction engaging device may further include: a ring groove in one of the connecting members; and a snap ring to be fitted into the ring groove and coming into contact with one of the friction plates of one of the groups. The snap ring may receive the one of the friction plates to restrict movement of the one of the friction plates to a side away from the piston. At least one of the ring groove or the one of the friction plates may include a movement regulator. The movement regulator may restrict movement of the one of the friction plates toward the piston to provide the stationary end plate.

In this case as well, the stationary end plate is obtained in a very simple manner using the existing members.

The present disclosure effectively reduces a drag phenomenon that may occur in a disengaged state with a simple structure to achieve a friction engaging device with a high fuel efficiency.

DETAILED DESCRIPTION

Now, embodiments of the present disclosure will be described in detail with reference to the drawings. Note that the following description of the embodiments is merely an example in nature, and is not intended to limit the scope, applications, or use of the present disclosure.

In the explanation, an output shaft 3, which will described later, extends in an "axial direction," the radius or diameter about the center of the output shaft 3 extends in a "radial direction," and a circumference about the center of the output shaft 3 extends in a "circumferential direction." In the axial direction, power is input through an "input side" to a transmission 1, which will described later, and output through an "output side" from the transmission 1.

Transmission

Figure 1:
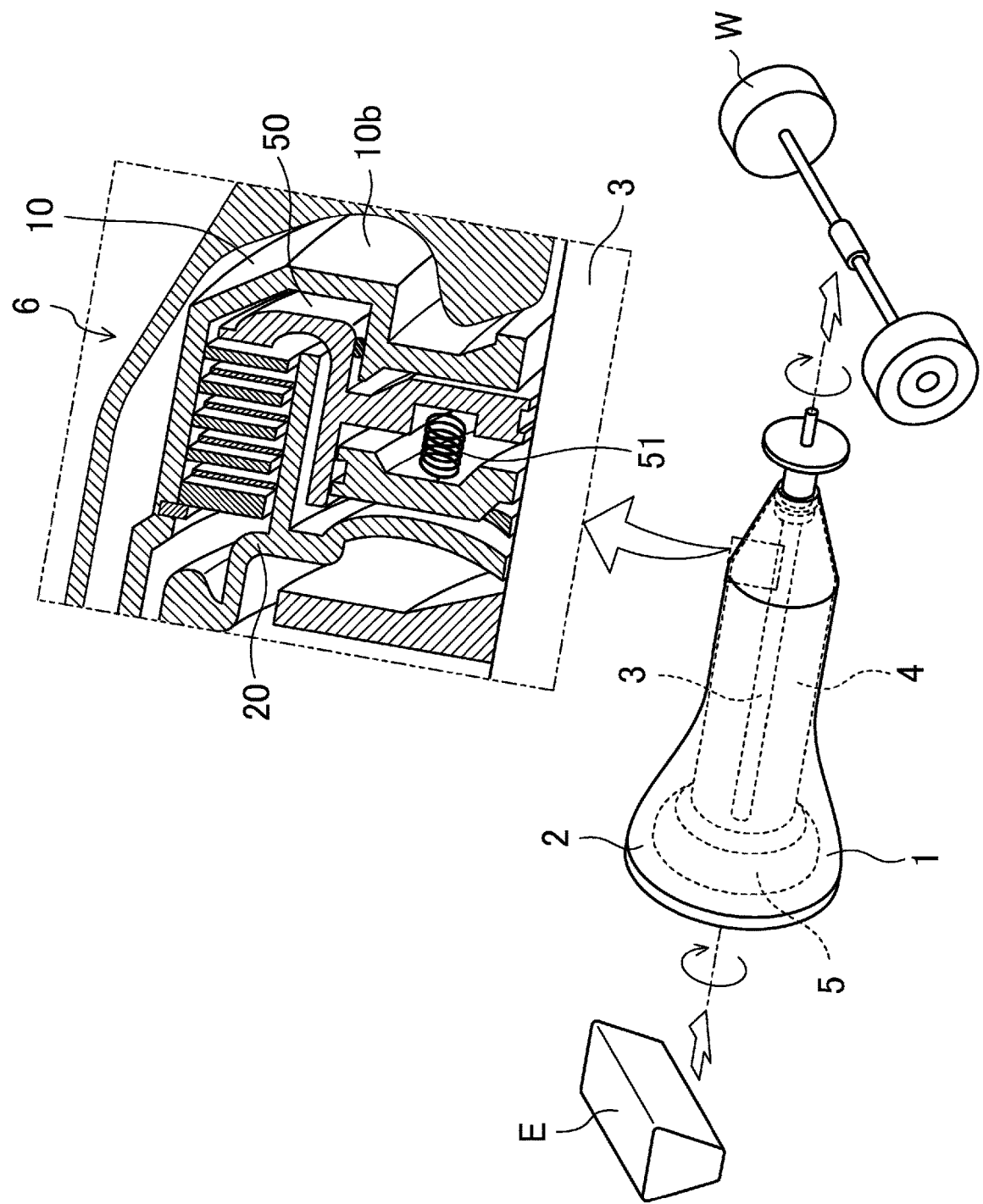
FIG. 1 is a schematic view of a transmission suitable for the present disclosure and associated devices. Enlarged is a schematic cross-sectional view of a part of a friction engaging device.

FIG. 1 illustrates the exemplary transmission (an automatic transmission) 1 suitable for the present disclosure. The transmission 1 is mounted on a motor vehicle. The transmission 1 is interposed between a driving source E, such as an engine and a motor, and wheels W to accelerate or decelerate the rotational power output from the driving source E and output the rotational power to the wheels.

The exemplary transmission 1 is a multistage automatic transmission (what is called an "AT"). The application of the present disclosure is not limited to the transmission 1. The present disclosure is applicable to anything that includes a wet friction engaging device.

The transmission 1 includes a housing 2, the output shaft (a rotary shaft) 3, a transmission device 4, and an intermittent device 5, for example. The housing 2 constitutes the outline of the transmission 1, houses the intermittent device 5 and the transmission device 4, and rotatably supports the output shaft 3.

The intermittent device (what is called a "torque converter") 5 is connected to the driving source E, and inputs the rotational power output from the driving source E to the transmission 1 as necessary. The transmission device 4 is located around the output shaft 3 and interposed between the intermittent device 5 and the output shaft 3. The transmission device 4 changes the speed of the rotational power input from the intermittent device 5 and transmits the power to the output shaft 3. The rotational power output from the transmission 1 through the output shaft 3 is transmitted to the wheels W.

The transmission device 4 includes planetary gear mechanisms assembled therein to change the speed of the rotational power to be output. In order to shift these planetary gear mechanisms, the transmission device 4 also includes a clutch or a brake (i.e., a friction engaging device 6) assembled therein. The transmission 1 changes the operation modes of the clutch or the brake to perform switching between forward and rearward movement and change the rotational speed.

Structure of Friction Engaging Device 6

The clutch and the brake have different functions but almost the same structures (hereinafter a clutch is referred to as the "friction engaging device 6").

Figure 2:
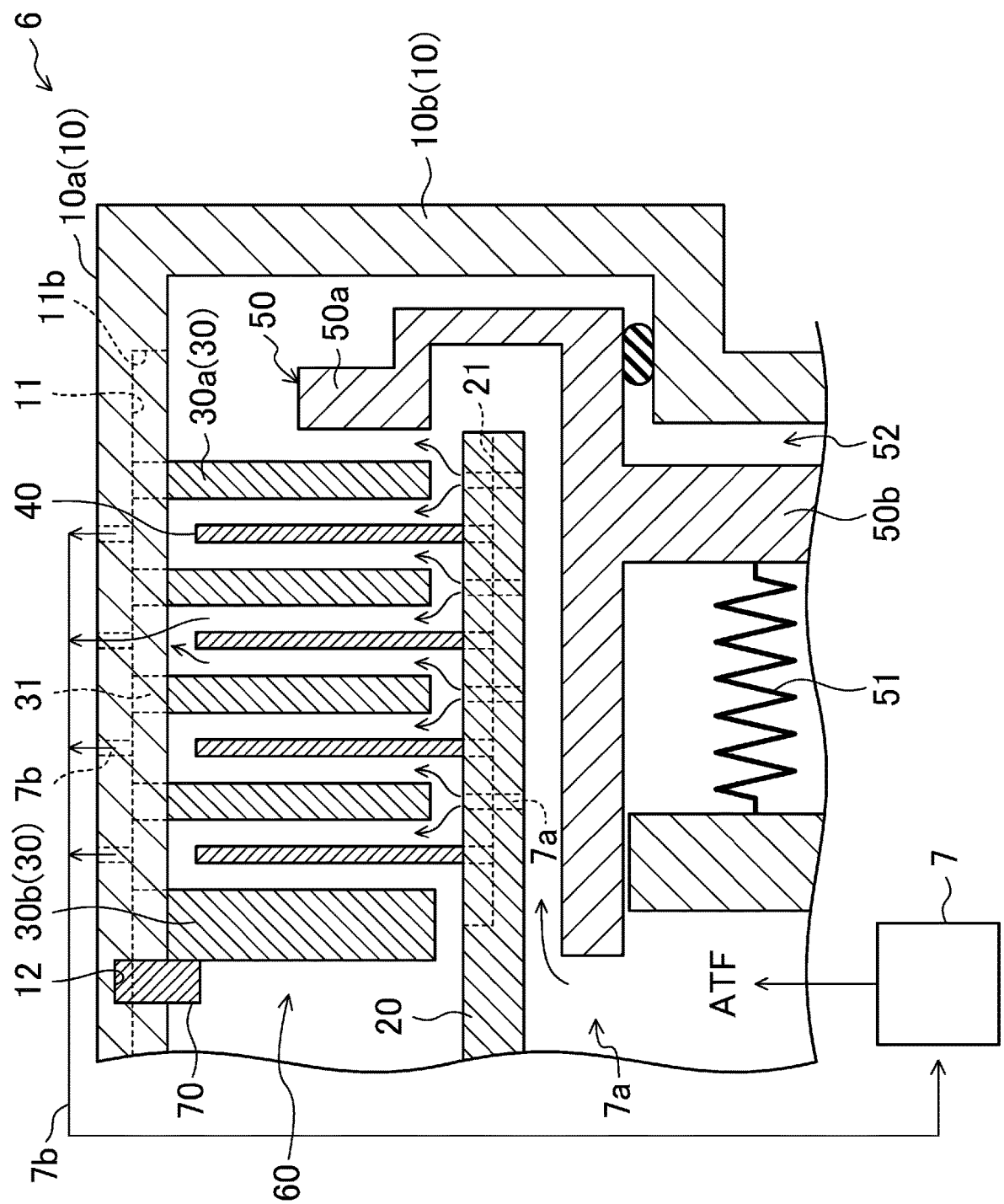
FIG. 2 is a simplified diagram of the friction engaging device corresponding to the enlarged view of FIG. 1.

FIG. 1 includes an enlarged view of a part of the clutch 6 included in the transmission device 4. In addition, FIG. 2 is a simplified diagram corresponding to the enlarged view. The illustrated clutch 6 includes a drum 10 and a hub 20 as "connecting members." For example, with structurally unrotatable drum 10 and hub 20, the clutch 6 can also serve as a brake. The clutch 6 includes, in addition to these drum 10 and hub 20, driven plates (i.e., first friction plates) 30, drive plates (i.e., second friction plates) 40, and a piston 50, for example.

Drum 10 and Hub 20

Figure 3:
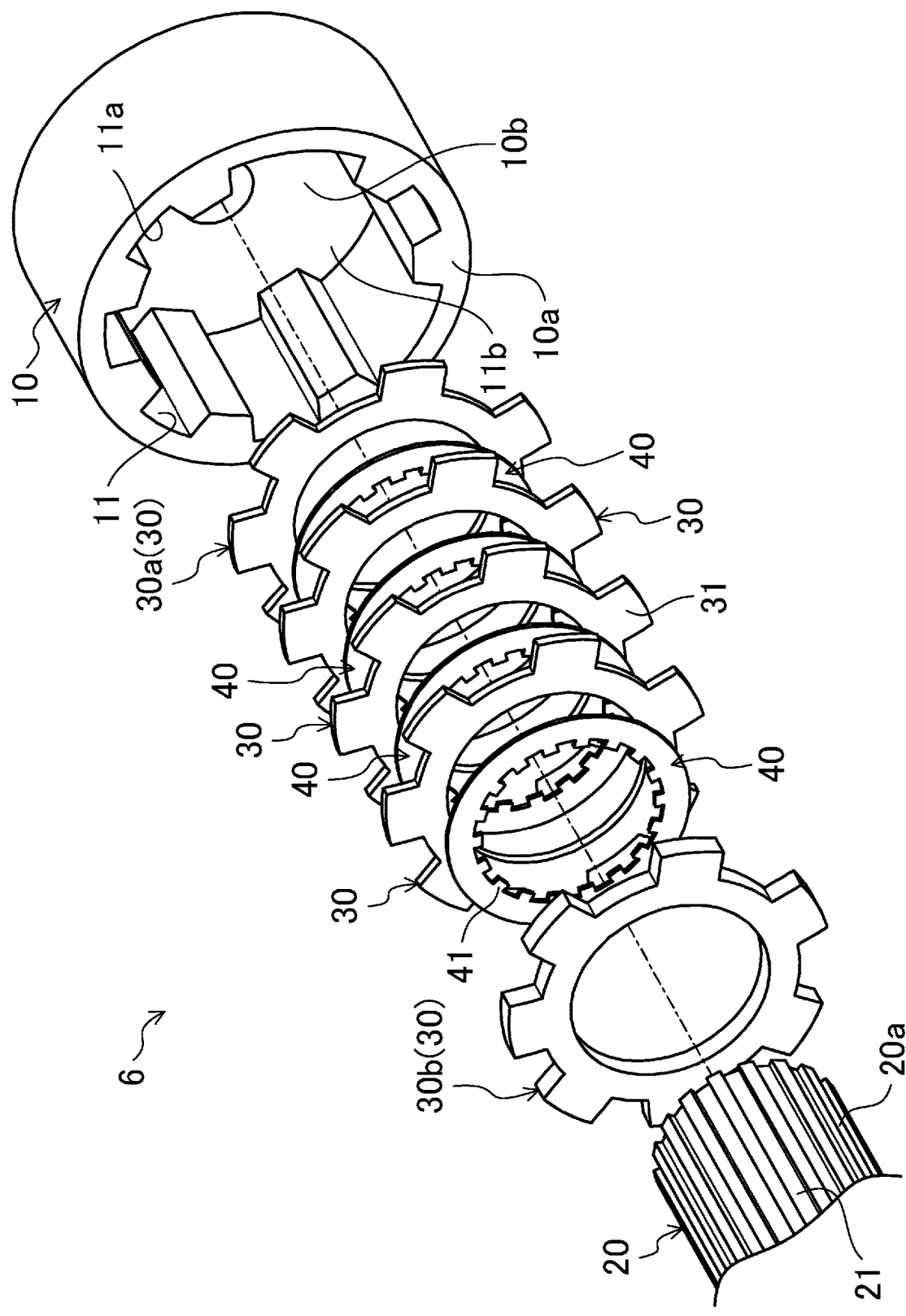
FIG. 3 is a schematic perspective view of an assembly structure of main members of the friction engaging device.

As simply shown in FIG. 3, the drum 10 is a bottomed cylindrical member including a cylindrical circumferential wall 10a, and a disk-like bottom wall 10b with a center penetrated by the output shaft 3. The drum 10 is coaxial with the output shaft 3 inside the housing 2 with its bottom wall 10b facing the output side. The hub 20 is a member including a cylindrical part (i.e., a hub shaft 20a) with a diameter smaller than the drum 10. The hub shaft 20a is housed inside the drum 10 and coaxial with the output shaft 3.

The drum 10 and the hub 20 are independently rotatably supported by the housing 2. Each of the drum 10 and the hub 20 is connected directly or indirectly to the output shaft 3 or the transmission device 4. In this clutch 6, the drum 10 is fixed to the output shaft 3, whereas the hub 20 is connected to the transmission device 4.

The inner circumferential surface of the circumferential wall 10a of the drum 10 and the outer circumferential surface of the hub shaft 20a face each other (i.e., opposed surfaces) in the radial direction. Between these opposed surfaces, a ring-like space (i.e., a plate housing chamber 60) is interposed. In the operation of the transmission 1, this plate housing chamber 60 is supplied with lubricating oil (e.g., automatic transmission fluid (ATF)) that circulates from a lubricating device 7 (shown only in FIG. 2) including an oil reservoir and a hydraulic pump, for example, through an oil inlet passage 7a in the hub shaft 20a and an oil feed passage 7a inside the housing 2 at a constant flow rate (what is called a "wet type").

The ATF supplied to the plate housing chamber 60 returns to the lubricating device 7 through an oil outlet passage 7b in the circumferential wall 10a of the drum 10 and an oil return passage 7b inside the housing 2.

The drum 10 has, in the inner circumferential surface of its circumferential wall 10a, first fitting grooves (i.e., slide recesses) 11 extending in the axial direction. The first fitting grooves 11 are spaced apart from each other in the circumferential direction. In the drum 10 according to the present embodiment, the ends of the first fitting grooves 11 on the input side are open (i.e., open ends 11a). On the other hand, the ends on the output side are closed by the bottom wall 10b (i.e., closed ends 11b).

Similarly, the hub shaft 20a has, in its outer circumferential surface, second fitting grooves 21 extending in the axial direction. The second fitting grooves 21 are also spaced apart from each other in the circumferential direction.

Driven Plates 30 and Drive Plates 40

As shown in FIG. 3, the driven plates 30 are ring plate members made of metal. Each driven plate 30 has first fitting pieces (i.e., slide projections) 31 protruding from its outer circumferential edge to be slidably fitted into the first fitting grooves 11. The first fitting pieces 31 are fitted (what is called "spline fitted") into the first fitting grooves 11 through the open ends 11a, whereby the driven plates 30 are attached to the drum 10 to be slidable in the axial direction.

As shown in FIG. 3, the drive plates 40 are ring plate members made of metal with a smaller thickness than the driven plates 30. Each drive plate 40 has second fitting pieces 41 protruding from its inner circumferential edge. The second fitting pieces 41 are fitted (i.e., "spline fitted") into the second fitting grooves 21, whereby the drive plates 40 are attached to the hub 20 to be slidable in the axial direction.

The group of the driven plates 30 and the group of the drive plates 40 are housed in the plate housing chamber 60 and alternately arranged in the axial direction with their surfaces facing each other. These friction plates of these two groups are collectively referred to as a "plate group."

In this clutch 6, one of the driven plates 30 is located at each end of the plate group in the axial direction. The driven plate 30 at the end on the output side is also referred to as an "output-side end plate 30a," whereas the driven plate 30 at the end on the input side is also referred to as an "input-side end plate 30b." In the clutch 6 according to the present embodiment, the input-side end plate 30b (also referred to as the retainer plate 30b) has a larger thickness than the other driven plates 30.

The drum 10 has, near the open ends 11a of the first fitting grooves 11, a ring groove 12 extending in the circumferential direction. Into the ring groove 12, an elastic snap ring 70 in the shape of a circular arc is fitted.

The snap ring 70 is fitted into the ring groove 12 to seal the open ends 11a of the first fitting grooves 11. Being slid to the input side, the retainer plate 30b comes into contact with the snap ring 70 to be received by the snap ring 70. This restricts (i.e., blocks) the movement of the retainer plate 30b toward the input side.

Piston 50

As shown in FIGS. 1 and 2, the piston 50, which slides in the axial direction, is located deepest in the drum 10, that is, on the output side of the plate housing chamber 60. The piston 50 according to the present embodiment is integrally formed of a press 50a and a mover 50b, for example.

The press 50a is located in the plate housing chamber 60 and closer to the output side than the plate group is. The press 50a faces the output-side end plate 30a in the axial direction. On the other hand, the mover 50b is located inside the hub 20 and between a spring 51 on the input side and a hydraulic chamber 52 in the output side. The hydraulic chamber 52 is liquid-tightly partitioned by the mover 50b.

The mover 50b is biased toward the output side by the elastic force of the spring 51. As necessary, pressure oil is supplied or discharged from a hydraulic pump (not shown) to the hydraulic chamber 52. Accordingly, the hydraulic pressure acts on the mover 50b to move the mover 50b in the axial direction.

Specifically, once the pressure oil is supplied to the hydraulic chamber 52, the mover 50b slides toward the input side against the elastic force of the spring 51. Once the pressure oil is discharged from the hydraulic chamber 52, the mover 50b is slid toward the output side by the elastic force of the spring 51. The mover 50b slid to the output side is received by the bottom wall 10b of the drum 10. This restricts (i.e., blocks) the movement of the mover 50b.

With this hydraulically controlled movement of the mover 50b, the press 50a moves in the plate housing chamber 60 forward from the output side toward the plate group.

Operation of Friction Engaging Device 6

In order to perform switching between the connection and the disconnection between the hub 20 and the drum 10, the clutch 6 is switched by hydraulic control.

Figure 4:
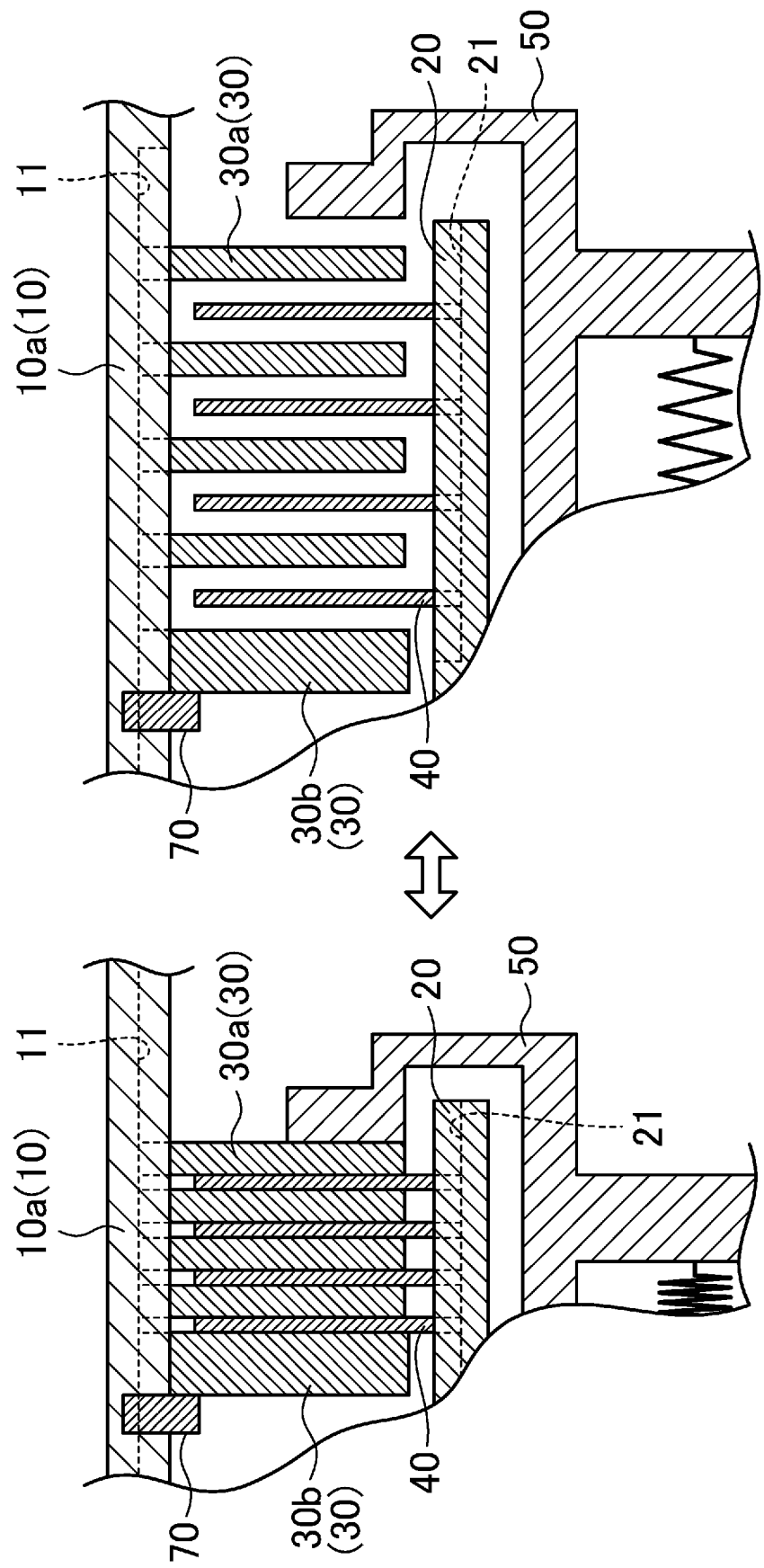
FIG. 4 is a schematic diagram illustrating an operation of the friction engaging device.

Specifically, as shown in FIG. 4, the clutch 6 is switched between the state (i.e., an engaged state) in which the driven plates 30 and the drive plates 40 are in close contact with each other, and the state (i.e., a disengaged state) in which the driven plates 30 and the drive plates 40 are separable from each other.

Specifically, once the pressure oil is supplied to the hydraulic chamber 52, the piston 50 (i.e., the press 50a) moves toward the input side as shown in the left view of FIG. 4. Accordingly, the plate group is engaged upon application of a pressing force. In the engaged state, the plate group including the retainer plate 30b is received by the snap ring 70, and the press 50a is positioned closest to the input side.

On the other hand, once the pressure oil is discharged from the hydraulic chamber 52, the piston 50 (i.e., the press 50a) is moved to the output side by the elastic force of the spring 51 as shown in the right view of FIG. 4. This separates the piston 50 from the plate group to release the pressing force from the plate group and make the plate group disengaged. In the disengaged state, since the press 50a is positioned closest to the output side, the distance between the press 50a and the snap ring 70 increases so that the driven plates 30 including the retainer plate 30b and the drive plates 40 are free (slidable in the axial direction) within the increased distance.

Since the driven plates 30 and drive plates 40 in the disengaged state are applied with no pressing force and slidable in the axial direction, no frictional force should act among these plates. In the wet clutch 6, however, the ATF is supplied among these plates. Its fluid friction may thus cause frictional resistance and eventually a torque loss (i.e., a drag phenomenon).

Specifically, while the hub 20 rotates in the disengaged state, the centrifugal force acts on the ATF introduced from the hub 20 into the plate housing chamber 60 to promote the flow of the ATF from the inside to the outside in the radial direction.

Since the ATF is usually supplied to the plate housing chamber 60 at a constant flow rate, the centrifugal force increases the flow rate with an increase in the rotational speed of the hub 20. The amount of the ATF discharged from the plate housing chamber 60 then exceeds the amount of the supplied ATF. In this state, there is a difference in the radial pressure between the surfaces of the adjacent pairs of the driven plates 30 and the drive plates 40 (also simply referred to as "plate surfaces") to cause a negative pressure between the plate surfaces.

Figure 5:
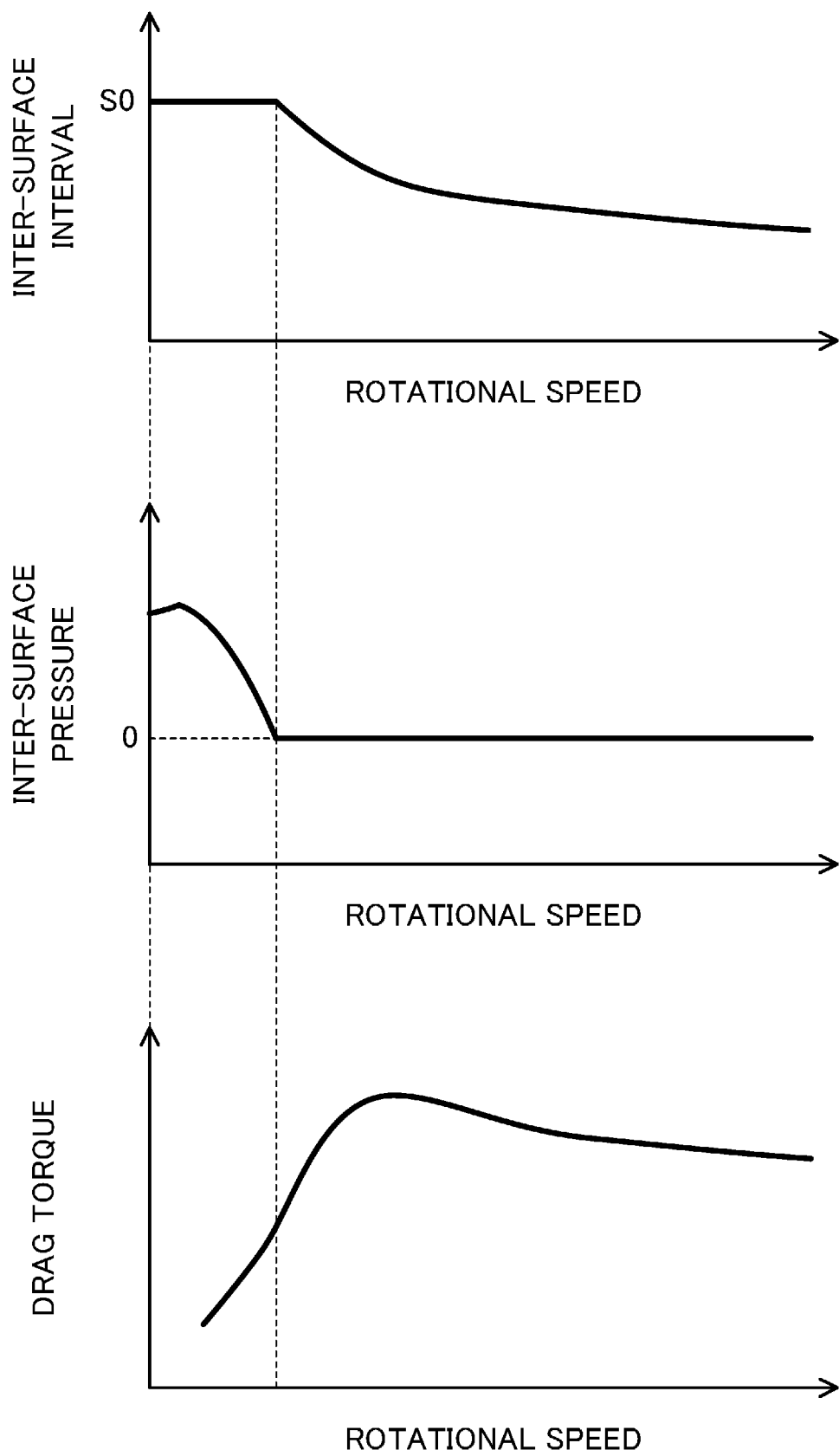
FIG. 5 provides graphs representing the relationships between (i) the rotational speed of a hub and (ii) an inter-surface interval, an inter-surface pressure, and a drag torque.

FIG. 5 provides exemplary graphs representing the relationships between (i) the rotational speed of the hub 20 and (ii) an inter-surface interval (i.e., the interval between the plate surfaces), an inter-surface pressure (i.e., the pressure between the plate surfaces), and the generated drag torque, obtained by a simulation. S0 denotes the inter-surface interval (also referred to as a "proper inter-surface interval S0") where the driven plates 30 and the drive plates 40 are equally spaced from each other, that is, arranged at an equal interval in the disengaged state.

At a low rotational speed, a smaller centrifugal force acts on the ATF so that the amount of supplied ATF is larger than the amount of discharged ATF. Accordingly, the inter-surface pressure increases (i.e., a positive pressure), and the inter-surface interval is almost equal to the proper inter-surface interval S0. This results in a low frictional resistance and a small drag torque.

With an increase in the rotational speed, the centrifugal force also increases. Accordingly, as described above, the amount of the discharged ATF exceeds the amount of the supplied ATF to cause a negative pressure between the plate surfaces. The driven plates 30 and drive plates 40 in the disengaged state are free in the axial direction at a larger interval in the axial direction. The plates are attracted to each other by the negative pressure and the pressure balance causes an inter-surface pressure of 0 (zero), whereas the inter-surface interval decreases.

Figure 6A:
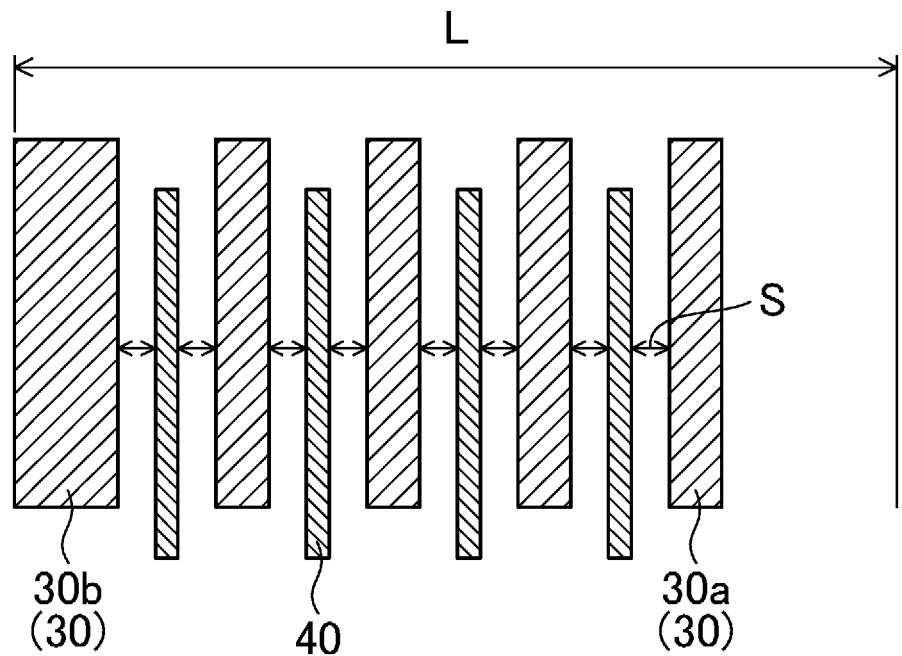
FIG. 6A illustrates the drag torque.

Specifically, as shown in FIG. 6A, the plate group actually acts as follows in the disengaged state at a high rotational speed. The driven plates 30 and the drive plates 40 are densely packed at a small interval S with respect to a movable range L in the axial direction and concentrated on the input side of the plate housing chamber 60. As a result, the drag torque increases under the influence of the fluid friction of the ATF present among the plate surfaces and remains at the high level.

Although the ideas of attaching springs, for example, between plate surfaces to increase the interval of the plate surfaces have been suggested, there are many problems such as a complicated structure. To address the problems, the present inventors found that the drag phenomenon can be effectively reduced with a very simple structure based on the mechanism of how the drag phenomenon occurs. The present disclosure is based on this finding.

APPLICATION OF PRESENT DISCLOSURE

Mechanism of Present Disclosure

As described above, being free in the axial direction, the plates in the disengaged state are attracted by the negative pressure, come close to each other, and are concentrated on the one side inside the plate housing chamber 60.

To address the problem, the present inventors found the following. The friction plates (i.e., the end plates) at respective ends of the plate group are kept at a larger distance in the axial direction in the disengaged state than in the engaged state. Accordingly, even if a negative pressure occurs between the plate surfaces, the pressure balance naturally maintains the inter-surface interval almost at the proper inter-surface interval S0.

Figure 6B:
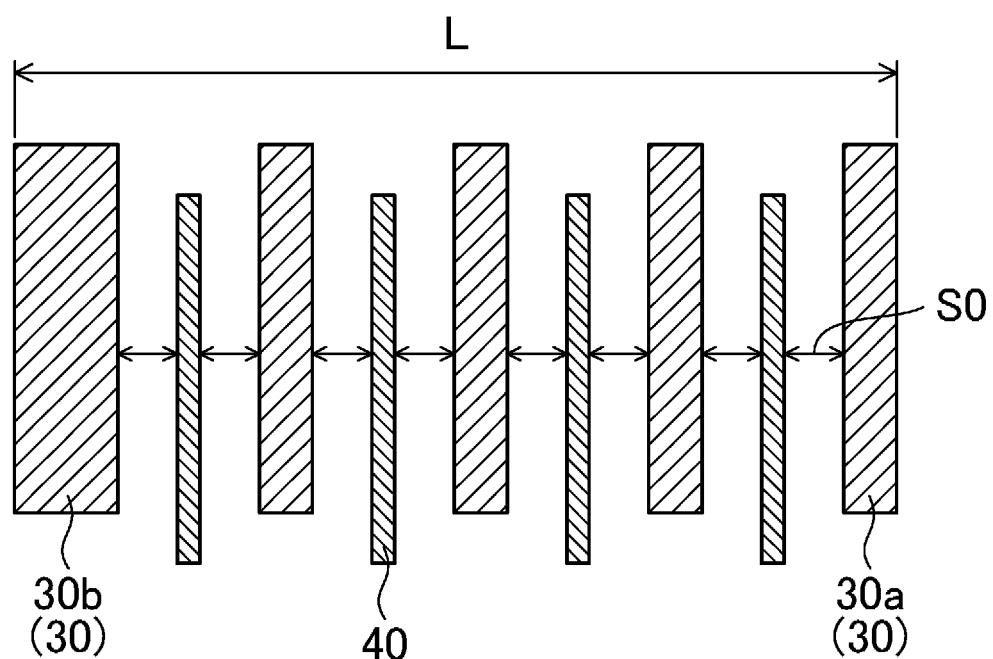
FIG. 6B illustrates a mechanism of the present disclosure.

Specifically, as shown in FIG. 6B, the end plates are spaced at a predetermined distance or more in the axial direction to provide a sufficient interval between the plate surfaces after the switch to the disengaged state. With this configuration, even if a negative pressure occurs between the plate surfaces, the inter-surface interval is naturally adjusted so that the pressure between the plate surfaces becomes equal to each other. The plates are then balanced at a substantially equal interval. As a result, the inter-surface interval is maintained almost at the proper inter-surface interval S0.

Figure 7:
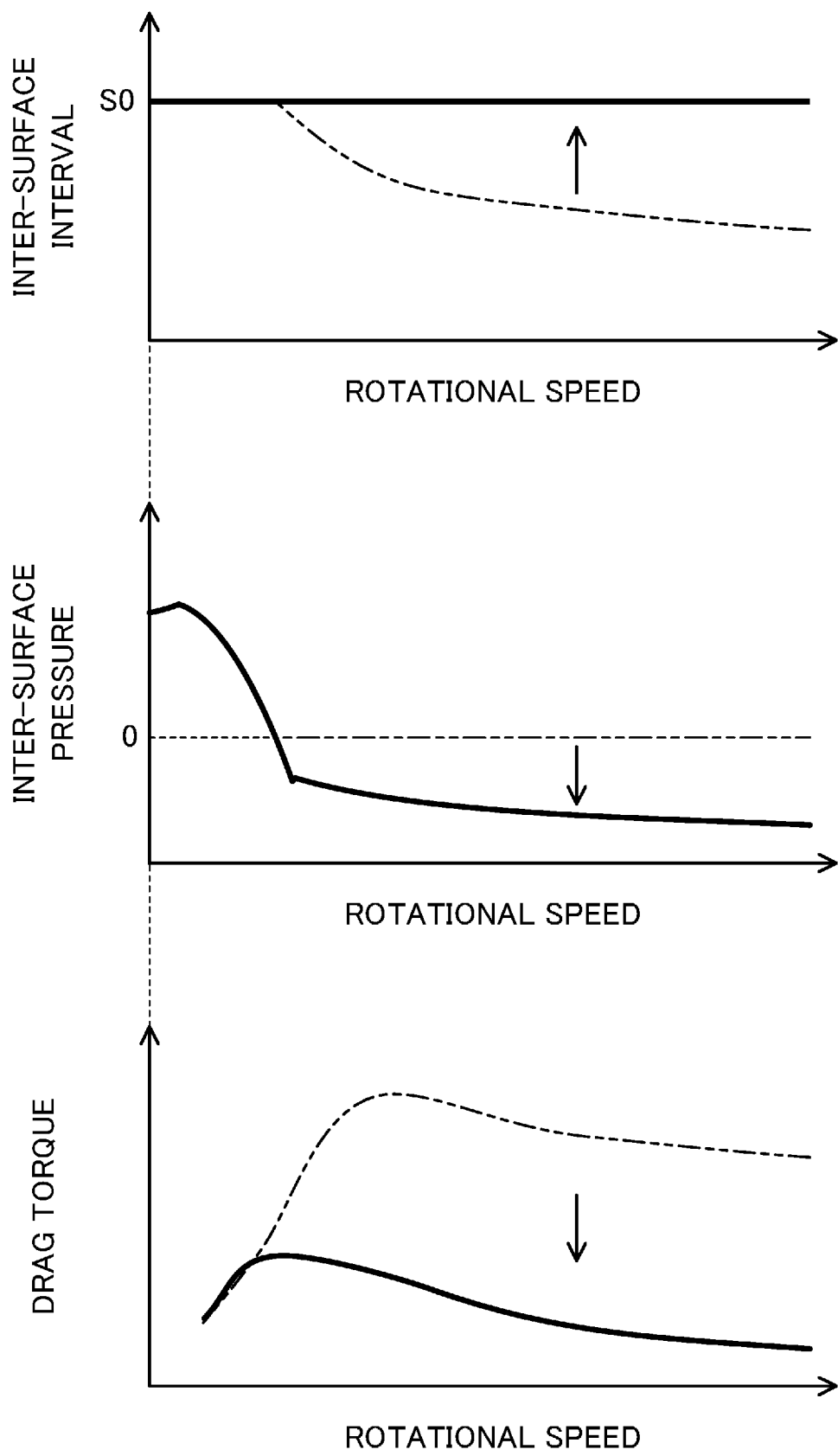
FIG. 7 provides graphs in application of the present disclosure, corresponding to FIG. 5.

FIG. 7 provides exemplary graphs based on a simulation where the end plates are kept in predetermined positions in a disengaged state, corresponding to FIG. 5. As shown in FIG. 7, with an increase in the rotational speed, adjacent pairs of the driven plates 30 and the drive plates 40 are attracted to each other by the negative pressure. This causes a negative inter-surface pressure.

On the other hand, it was confirmed that the inter-surface interval was almost unchanged and maintained at the proper inter-surface interval S0 and that the drag torque largely decreased. Therefore, the end plates in the disengaged state are kept at a predetermined distance to maintain the inter-surface interval at the proper inter-surface interval S0. This configuration effectively reduces the drag phenomenon.

DETAILED DESCRIPTION OF THE DISCLOSURE

Figure 8:
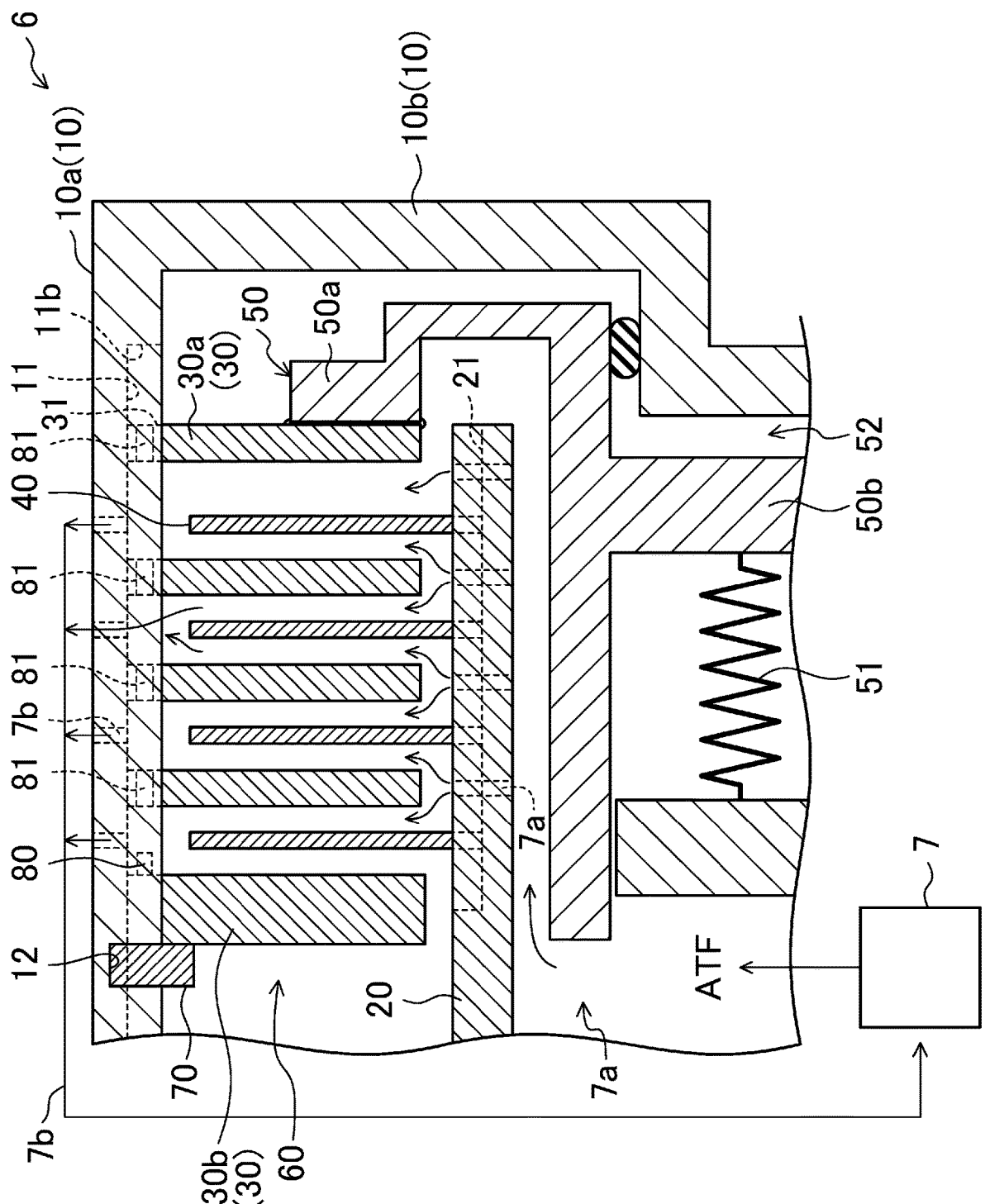
FIG. 8 is a schematic diagram showing a specific example of a friction engaging device employing the present disclosure.

FIG. 8 shows a specific example of the transmission 1 described above employing the present disclosure. In this specific example, one of the end plates is a movable end plate movable in the axial direction, and the other is a stationary end plate immovable in the axial direction.

Movable End Plate

As shown in FIG. 8, the movable end plate may be obtained by welding the output-side end plate 30a (one of the driven plates 30) to the press 50a of the piston 50. The driven plate 30 welded to the press 50a moves in the axial direction together with the piston 50 and can be kept in a predetermined position in the disengaged state. In this case, the stationary end plate is obtained using the existing members as they are.

A possible piston 50 may include an end plate and a press 50a that are integral through integral molding. The driven plate 30 on the output side is integral with the piston 50. This properly and easily provides the movable end plate without requiring any complex structure.

Stationary End Plate

As shown in FIG. 8, the stationary end plate may be obtained as follows. The first fitting grooves 11 have protrusions 80 at their ends on the input side. The protrusions 80 restrict sliding of the input-side end plate 30b (i.e., the retainer plate 30b), which is fitted last into the first fitting grooves 11, toward the output side.

Figure 9:
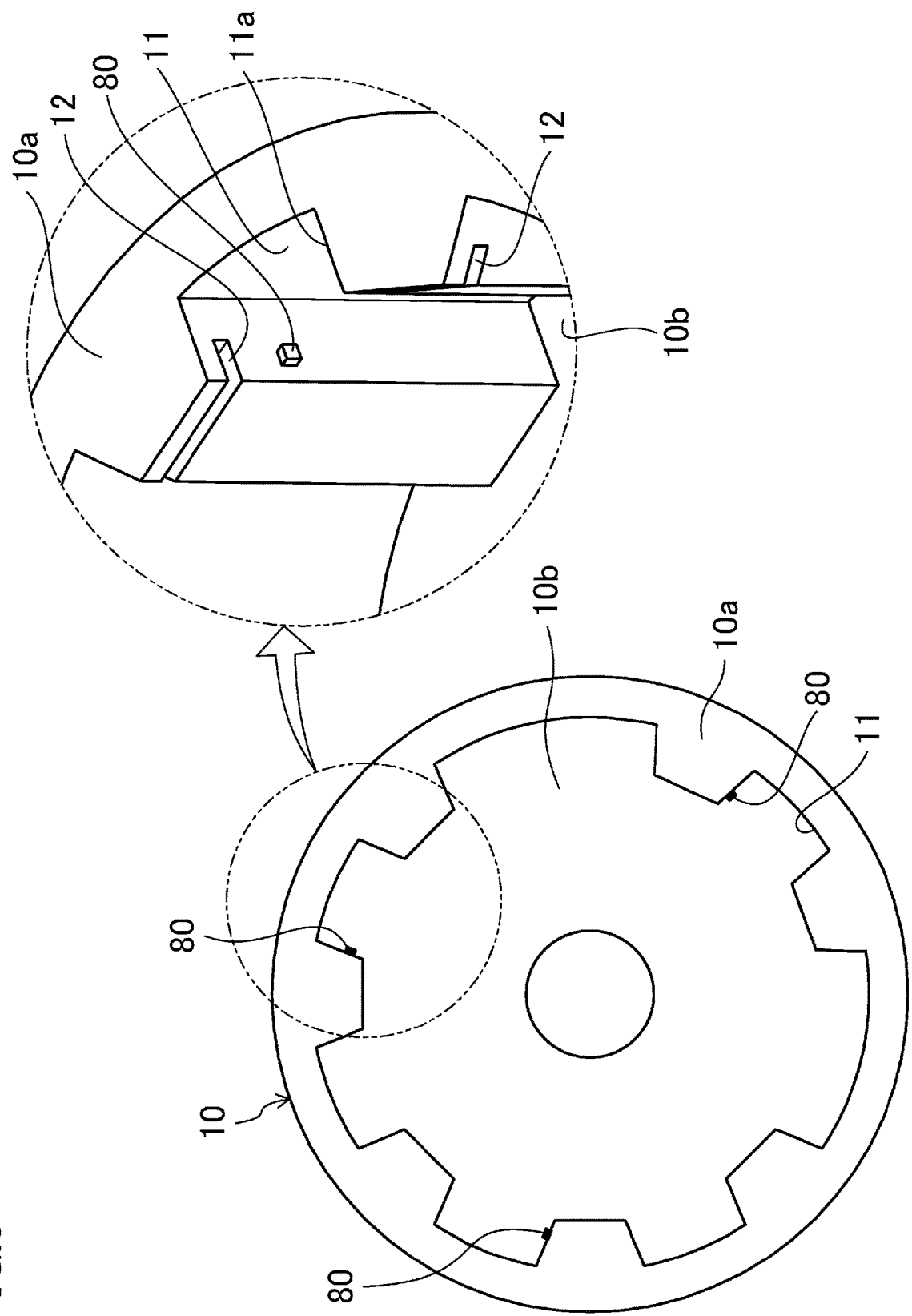
FIG. 9 illustrates a configuration of a stationary end plate.

Specifically, as shown in FIGS. 9 and 10, the small protrusions 80 projecting inward are formed on the inner wall surfaces of some first fitting grooves 11 near the open ends 11a. The protrusions 80 are located closer to the output side than the ring groove 12 to leave gaps slightly larger than the thickness of the retainer plate 30b between the ring groove 12 and the protrusion 80. The ring groove 12 shown in FIG. 9 is one embodiment of the ring groove 12 schematically shown in FIG. 2.

Figure 10A:
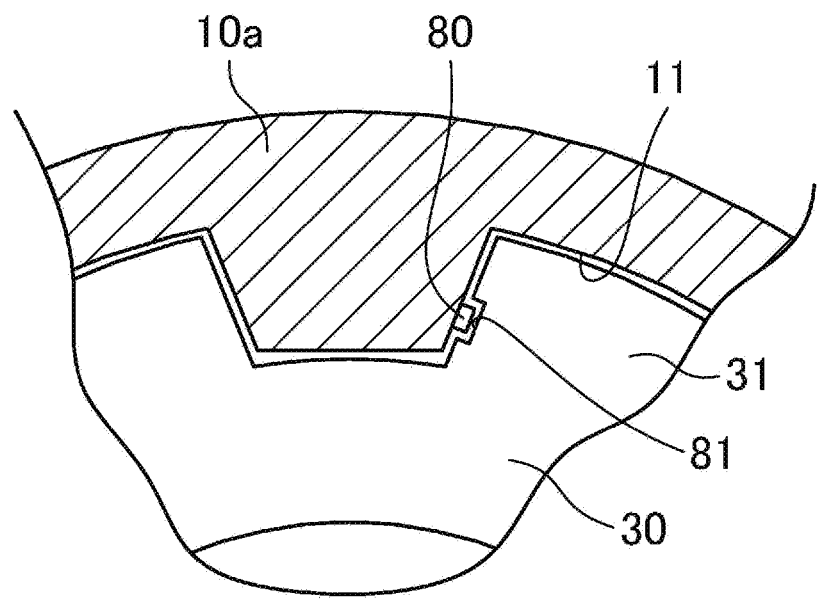
FIGS. 10A and 10B illustrate the configuration of the stationary end plate.

In addition, as shown in FIG. 10A, each of the driven plates 30 except for the retainer plate 30b has cut-outs 81 in the first fitting pieces 31 to be fitted into the first fitting grooves 11 with the protrusions 80 to prevent or reduce the contact with the protrusions 80.

In this transmission 1, the driven plates 30 are assembled to the drum 10 as follows. While the driven plates 30 and the drive plate 40 are arranged alternately, the first fitting pieces 31 are fitted into the first fitting grooves 11 to be attached to the drum 10. At this time, the driven plates 30 can be attached to the drum 10 without any problem, even if the first fitting grooves 11 have the protrusions 80, since the driven plates 30 have the cut-outs 81.

Figure 10B:
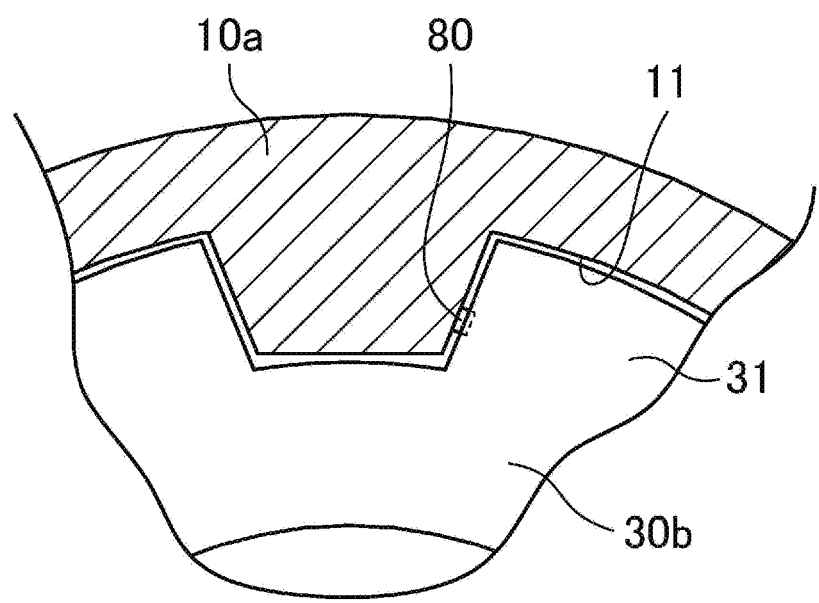

On the other hand, as shown in FIG. 10B, the retainer plate 30b, whose first fitting pieces 31 are last fitted into the first fitting grooves 11, has no cut-outs 81. Accordingly, the slide of the retainer plate 30b toward the output side is restricted by the protrusions 80. That is, the protrusions 80 serve as movement regulators to restrict the movement of the retainer plate 30b toward the output side. Since the snap ring 70 restricts the movement toward the output side, the retainer plate 30b serves as the stationary end plate.

Such a stationary end plate can be easily obtained simply by changing the shapes of the existing members, that is, the drum 10 and some of the driven plates 30.

As shown in FIG. 9, the protrusions 80 are formed at three or more of the first fitting grooves 11 apart at a substantially equal interval in the circumferential direction in one preferred embodiment. This configuration reduces a large inclination of the stationary end plate in the axial direction and thus restricts the movement of the stationary end plate in a well-balanced manner.

Other Embodiments of Stationary End Plate

The stationary end plate may also be obtained using the ring groove 12. Specifically, at least one of the ring groove 12 or the retainer plate 30b includes a movement regulator. The movement regulator restricts movement of the retainer plate 30b toward the output side to provide the stationary end plate.

Figure 11A:
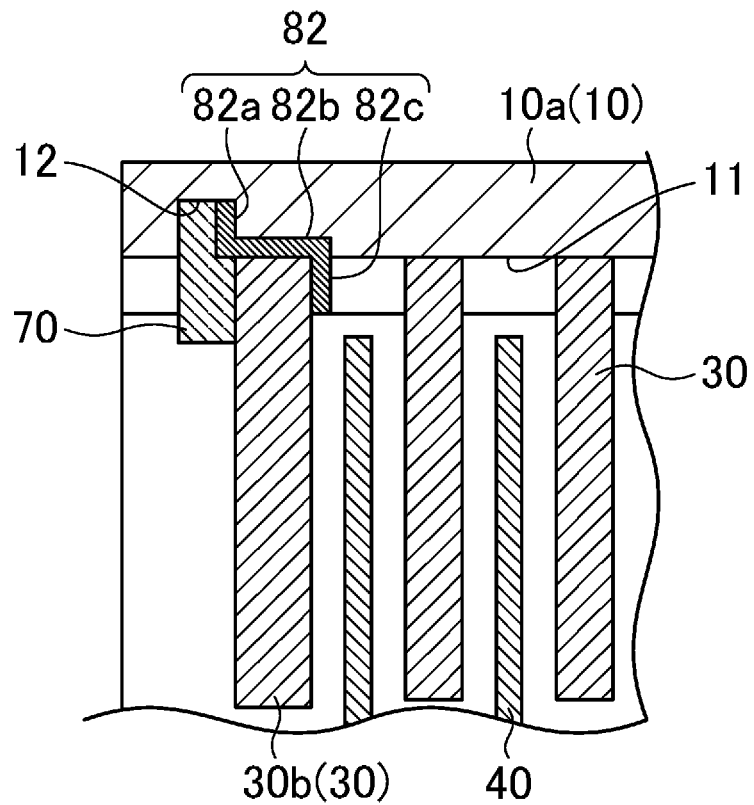
FIG. 11A is a schematic view showing another embodiment of the stationary end plate.

FIG. 11A shows an example (i.e., a first embodiment). In the first embodiment, plate holders 82 to be fitted into the ring groove 12 serves as a movement regulator 82c. Each plate holder 82 includes a leg 82a to be fitted into the associated ring groove 12, an extension 82b to be fitted between the end of the retainer plate 30b and the inner surface of the associated first fitting groove 11, and a regulator 82c in contact with the surface of the retainer plate 30b. The leg 82a, the extension 82b, and the regulator 82c are integral with each other.

After the plate holder 82 is attached to the ring groove 12, the retainer plate 30b is attached to the drum 10. The snap ring 70 is then fitted into the ring groove 12 to fix the retainer plate 30b to the drum 10. In this case, the parts of the drum 10 attached with the plate holders 82 are additionally processed in one preferred embodiment in accordance with the shapes of the plate holders 82.

Figure 11B:
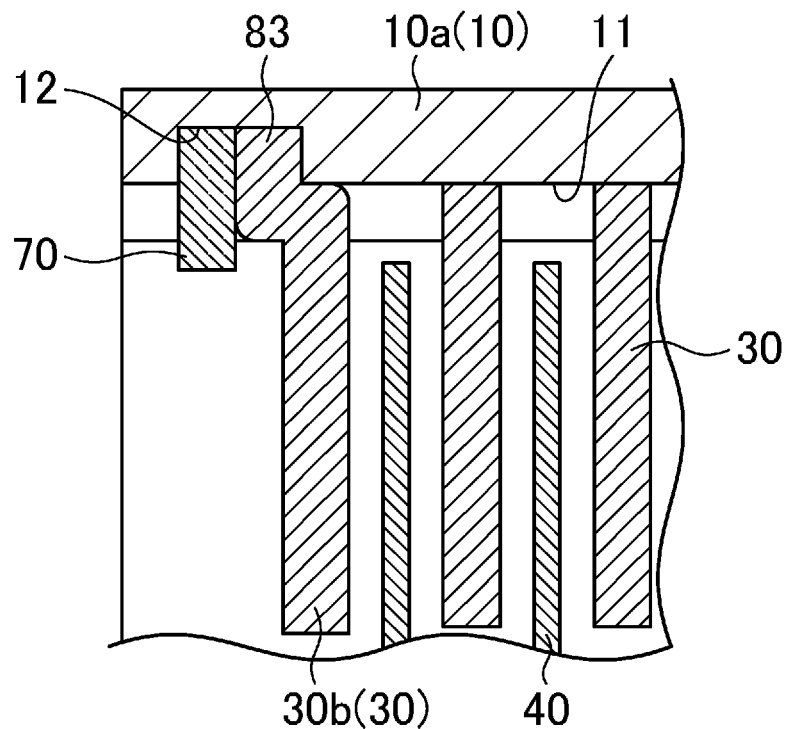
FIG. 11B is a schematic view showing further another embodiment of the stationary end plate.

FIG. 11B shows another example (i.e., a second embodiment). In the second embodiment, the retainer plate 30b has, at parts of the outer circumferential edge, a regulator piece 83 to be fitted into the ring groove 12, which serve as movement regulators. For example, the regulator pieces 83 may be obtained by extending the parts of the outer circumferential edge of the retainer plate 30b outward in the radial direction and bending the extensions 82b in accordance with the shape of the ring groove 12.

The movement regulators are formed along the entire circumference or at three or more positions apart at a substantially equal interval in the circumferential direction in one preferred embodiment. This configuration restricts the movement of the stationary end plate in a well-balanced manner.

The exemplary configurations of the movable and stationary end plates described above are mere examples. There is only a need for the movable end plate to be movable in the axial direction, and the stationary end plate to be immovable in the axial direction, and for the movable and stationary end plates to be kept at a predetermined distance in the disengaged state. These configurations may be modified in accordance with the specifications. The shape of the ring groove 12 and the protrusion 80 may also be modified in accordance with the specifications.

The friction engaging device according to the present disclosure is not limited to the embodiments and also includes various other configurations. For example, the type of the transmission employing the present disclosure is not limited to the transmission 1 described above. As long as including a wet friction engaging device, the transmission may be used not only in a motor vehicle but also for any other purpose.

The invention claimed is:

1. A wet friction engaging device for switching transmission of power to be output to a rotary shaft, the device comprising:
   two connecting members, each having an opposed surface facing an opposed surface of the other connecting member in a radial direction with a plate housing chamber interposed therebetween, the chamber being supplied with lubricating oil;
   a plate group engaged with the connecting members and including two groups of friction plates housed in the plate housing chamber and alternately arranged in an axial direction with surfaces facing each other; and
   a piston moving forward from one side in the axial direction toward the plate group to apply a pressing force to the plate group, wherein
   the plate group is switched between an engaged state in which the friction plates are in close contact with each other upon application of the pressing force, and a disengaged state in which the friction plates are separable from each other upon release of the pressing force,
   a distance between end plates at respective ends of the plate group in the axial direction in the disengaged state is larger than a distance between end plates at respective ends of the plate group in the axial direction in the engaged state,
   one of the end plates is a movable end plate movable in the axial direction together with the piston, and the other is a stationary end plate immovable in the axial direction,
   the opposed surface of one of the connecting members has slide recesses extending in the axial direction and having closed ends on a side closer to the piston,
   each of the friction plates of one of the groups has slide projections to be fitted into the slide recesses from a side away from the piston so as to be slidable, the slide recesses include a movement regulator at a part away from the piston, and the movement regulator restricts sliding of one of the friction plates of the one of the groups, which is fitted last, toward the piston to define the stationary end plate and blocks sliding on a side of the stationary end plate closer to the piston.

2. The friction engaging device of claim 1, wherein the movable end plate is integral with the piston through welding or integral molding.

3. The friction engaging device of claim 2, further comprising:

a ring groove in one of the connecting members; and a snap ring to be fitted into the ring groove and coming into contact with one of the friction plates of one of the groups, wherein the snap ring receives the one of the friction plates to restrict movement of the one of the friction plates to the side away from the piston.

4. The friction engaging device of claim 1, further comprising:

a ring groove in one of the connecting members; and a snap ring to be fitted into the ring groove and coming into contact with one of the friction plates of one of the groups, wherein the snap ring receives the one of the friction plates to restrict movement of the one of the friction plates to the side away from the piston.

5. A wet friction engaging device for switching transmission of power to be output to a rotary shaft, the device comprising:

two connecting members, each having an opposed surface facing an opposed surface of the other connecting member in a radial direction with a plate housing chamber interposed therebetween, the chamber being supplied with lubricating oil;

a plate group engaged with the connecting members and including two groups of friction plates housed in the plate housing chamber and alternately arranged in an axial direction with surfaces facing each other; and a piston moving forward from one side in the axial direction toward the plate group to apply a pressing force to the plate group, wherein the plate group is switched between an engaged state in which the friction plates are in close contact with each other upon application of the pressing force, and a disengaged state in which the friction plates are separable from each other upon release of the pressing force, a distance between end plates at respective ends of the plate group in the axial direction in the disengaged state is larger than a distance between end plates at respective ends of the plate group in the axial direction in the engaged states, one of the end plates is a movable end plate movable in the axial direction together with the piston, and the other is a stationary end plate immovable in the axial direction, the opposed surface of one of the connecting members has slide recesses extending in the axial direction and having closed ends on a side closer to the piston, each of the friction plates of one of the groups has slide projections to be fitted into the slide recesses from a side away from the piston so as to be slidable, the slide recesses include a movement regulator at a part away from the piston, and the movement regulator restricts sliding of one of the friction plates of the one of the groups, which is fitted last, toward the piston to define the stationary end plate, the device further comprising:

a ring groove in one of the connecting member, and a snap ring to be fitted into the ring groove and coming into contact with one of the friction plates of one of the groups, wherein the snap ring receives the one of the friction plates to restrict movement of the one of the friction plates to the side away from the piston.

6. The friction engaging device of claim 5, wherein the movable end plate is integral with the piston through welding or integral molding.

* * * * *